(12) United States Patent
Hunt (10) Patent No.: US 8,701,601 B2
(45) Date of Patent: Apr. 22, 2014

(54) WANDER RESTRAINT

(76) Inventor: Thomas Joel Hunt, Sheffield (GB)

( * ) Notice: Subject to any disclaimer, the term of this patent is extended or adjusted under 35 U.S.C. 154(b) by 162 days.

(21) Appl. No.: 13/000,378

(22) PCT Filed: Jun. 19, 2009

(86) PCT No.: PCT/GB2009/001553
§ 371 (c)(1),
(2), (4) Date: Dec. 21, 2010

(87) PCT Pub. No.: WO2009/153574
PCT Pub. Date: Dec. 23, 2009

(65) Prior Publication Data
US 2011/0100306 A1 May 5, 2011

(30) Foreign Application Priority Data
Jun. 21, 2008 (GB) .................................. 0811476.1

(51) Int. Cl.
*A01K 27/00* (2006.01)
(52) U.S. Cl.
USPC ........................................ 119/794; 119/770
(58) Field of Classification Search
USPC ........................... 119/770, 792–794, 858, 857
See application file for complete search history.

(56) References Cited

U.S. PATENT DOCUMENTS

| 4,328,767 | A | * | 5/1982 | Peterson | 119/794 |
| 4,584,967 | A | * | 4/1986 | Taplin | 119/793 |
| 5,595,143 | A | * | 1/1997 | Alberti | 119/794 |
| 5,632,235 | A | * | 5/1997 | Larsen et al. | 119/856 |
| 6,276,305 | B1 | * | 8/2001 | Pages | 119/792 |
| 6,443,101 | B1 | * | 9/2002 | Fazio | 119/792 |
| 6,662,754 | B1 | * | 12/2003 | Wilson | 119/850 |
| 7,461,615 | B2 | * | 12/2008 | Albright | 119/794 |
| 7,497,186 | B2 | * | 3/2009 | Dorton et al. | 119/72 |
| 7,938,086 | B2 | * | 5/2011 | Cobb et al. | 119/770 |
| D653,410 | S | * | 1/2012 | Morton | D30/152 |
| 2005/0217609 | A1 | * | 10/2005 | Dorton et al. | 119/792 |
| 2008/0092825 | A1 | * | 4/2008 | Ginakes | 119/770 |

\* cited by examiner

*Primary Examiner* — Kristen C Hayes
(74) *Attorney, Agent, or Firm* — James Creighton Wray (57) ABSTRACT

Apparatus for a child or an animal, comprising: a wearable item configured to be secured around the body and arms limbs of a child or an animal. The wearable item comprises a pocket presenting a first aperture and a second aperture, and a leash having a first end secured within a housing and a second end secured to a handle. The housing is configured to be removably received within the pocket through the first aperture, and the handle is configured to be passed from within the pocket through the second aperture.

15 Claims, 10 Drawing Sheets

WANDER RESTRAINT

CROSS REFERENCE TO RELATED APPLICATIONS

This application claims priority from United Kingdom Patent Application No. 08 11 476.1, filed 21 Jun. 2008, the entire disclosure of which is incorporated herein by reference in its entirety.

TECHNICAL FIELD

The present invention relates to wearable wander restraint apparatus for the body of a child or an animal and a method of providing wearable wander restraint apparatus for a child or an animal.

BACKGROUND OF THE INVENTION

The use of harnesses for attachment to the body of a child or animal is known. The attachment of a leash to a harness in order to prevent the wearer from wandering too far away is also known. However, problems do arise when the wearer shows reluctance to being fitted with both the harness and the leash. These items are often fitted to the wearer separately. The detachment and reattachment of a leash to a harness can be awkward, even more so if the wearer shows resistance to this procedure. Thus, the fitting of restraint apparatus to a body can prove especially cumbersome for people whose dexterity is impaired, for example a person suffering from arthritis.

BRIEF SUMMARY OF THE INVENTION

According to an aspect of the present invention, there is wearable wander restraint apparatus for a child or an animal, comprising: a wearable item configured to be secured around the body and arm limbs of a child or an animal, said wearable item comprising a pocket presenting a first aperture and a second aperture, and a leash having a first end secured within a housing and a second end secured to a handle, said housing configured to be removably received within said pocket through said first aperture, and said handle configured to be passed from within said pocket through said second aperture.

According to a second aspect of the present invention, a harness is provided for use in the method, the harness having a pocket presenting a first aperture and a second aperture, said harness configured to be secured around the body and arm limbs of a child or an animal. A leash is provided for use in the method, the leash having a first end secured within a housing and a second end secured to a handle. A leash is provided that comprises an end portion and a fastening mechanism attached to said leash, said fastening mechanism configured to releasably fasten said end portion to said leash to form a handle.

DESCRIPTION OF THE BEST MODE FOR CARRYING OUT THE INVENTION

Figure 1:
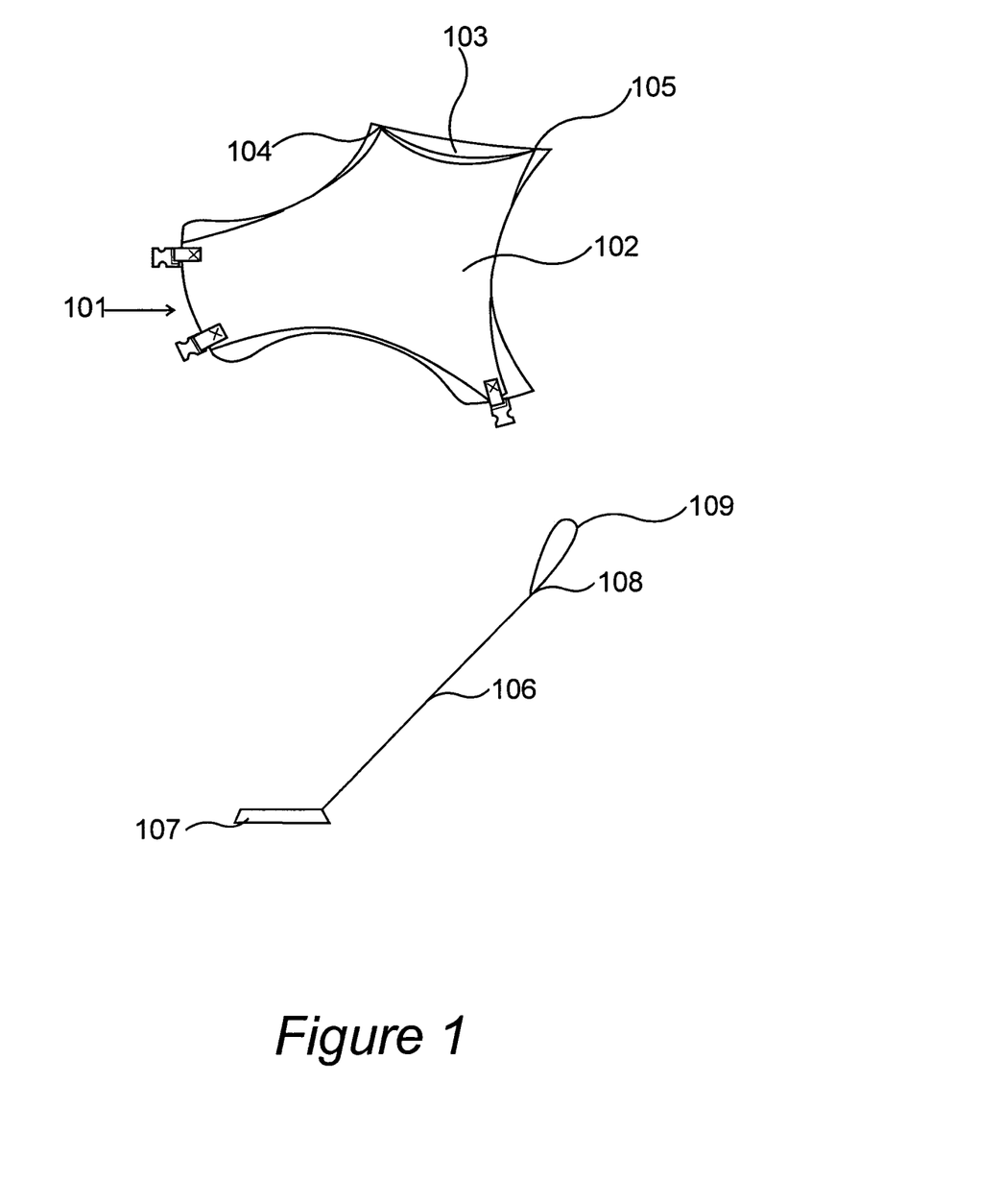
FIG. 1 shows a wander restraint apparatus for a child or an animal.

FIG. 1

FIG. 1 shows wearable wander restraint apparatus for a child or an animal. Wander restraint apparatus 101 comprises a wearable item 102 configured to be removably secured around the body and arm limbs of a child or an animal. It is to be appreciated that reference to "arm limbs" is used to refer to either the arms of a human body or the equivalent limbs of an animal.

The wearable item comprises a pocket 103 presenting a first aperture 104 and a second aperture 105. Wander restraint apparatus 101 also comprises a leash 106 having a first end secured within a housing 107 and a second end 108 secured to a handle 109.

Figure 2:
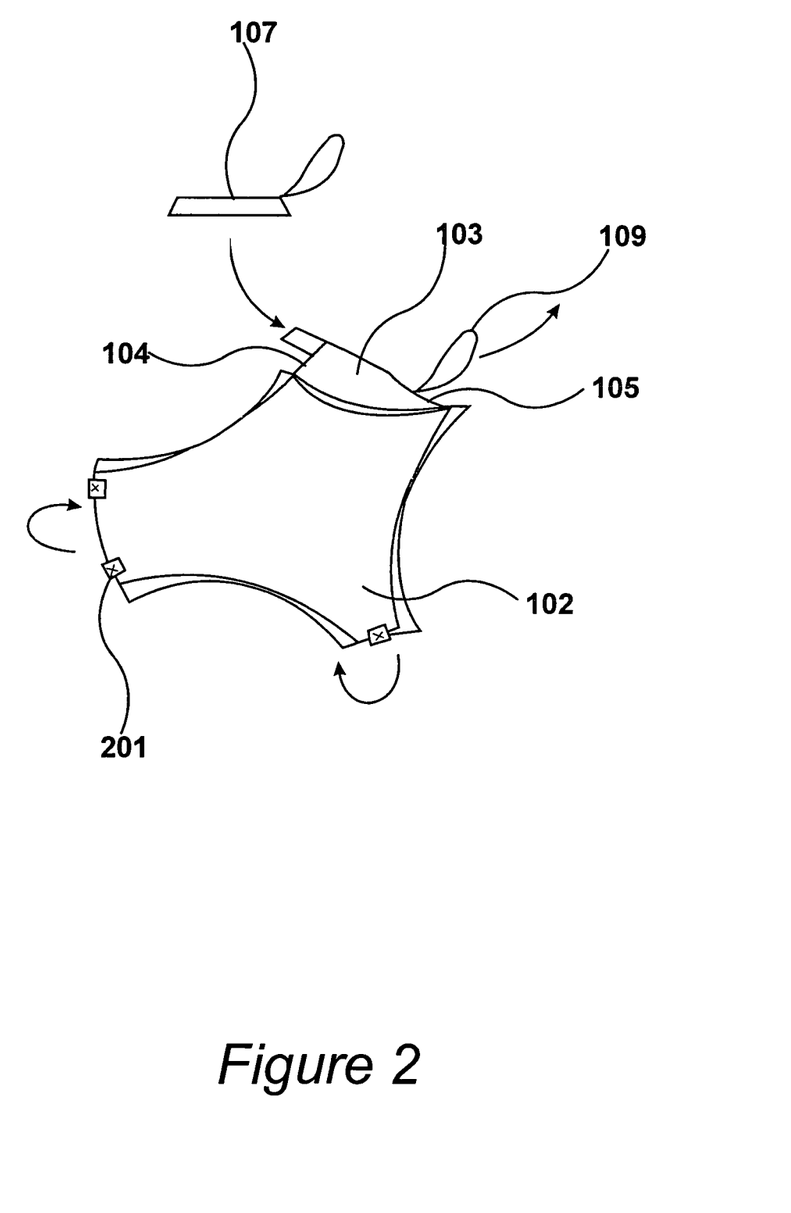
FIG. 2 shows a leash housing that is configured to be removably received within a pocket.

FIG. 2

As illustrated in FIG. 2, the housing 107 is configured to be removably received within pocket 103 through first aperture 104. Handle 109 is configured to be passed from within the pocket through the second aperture 105.

In this way the handle of the leash is presented exterior of the pocket, for use by a guardian of the wearer of the wearable item. Housing 107 of the leash is configured to be removably received within the pocket. In this embodiment push clips, such as push clip 201, are provided to facilitate fitting of the wearable item around a body. In this example the wearable item takes the form of a harness, however, the wearable apparatus may vary in form between applications, and may for example take the form of a novelty jacket or a rucksack.

Figure 3:
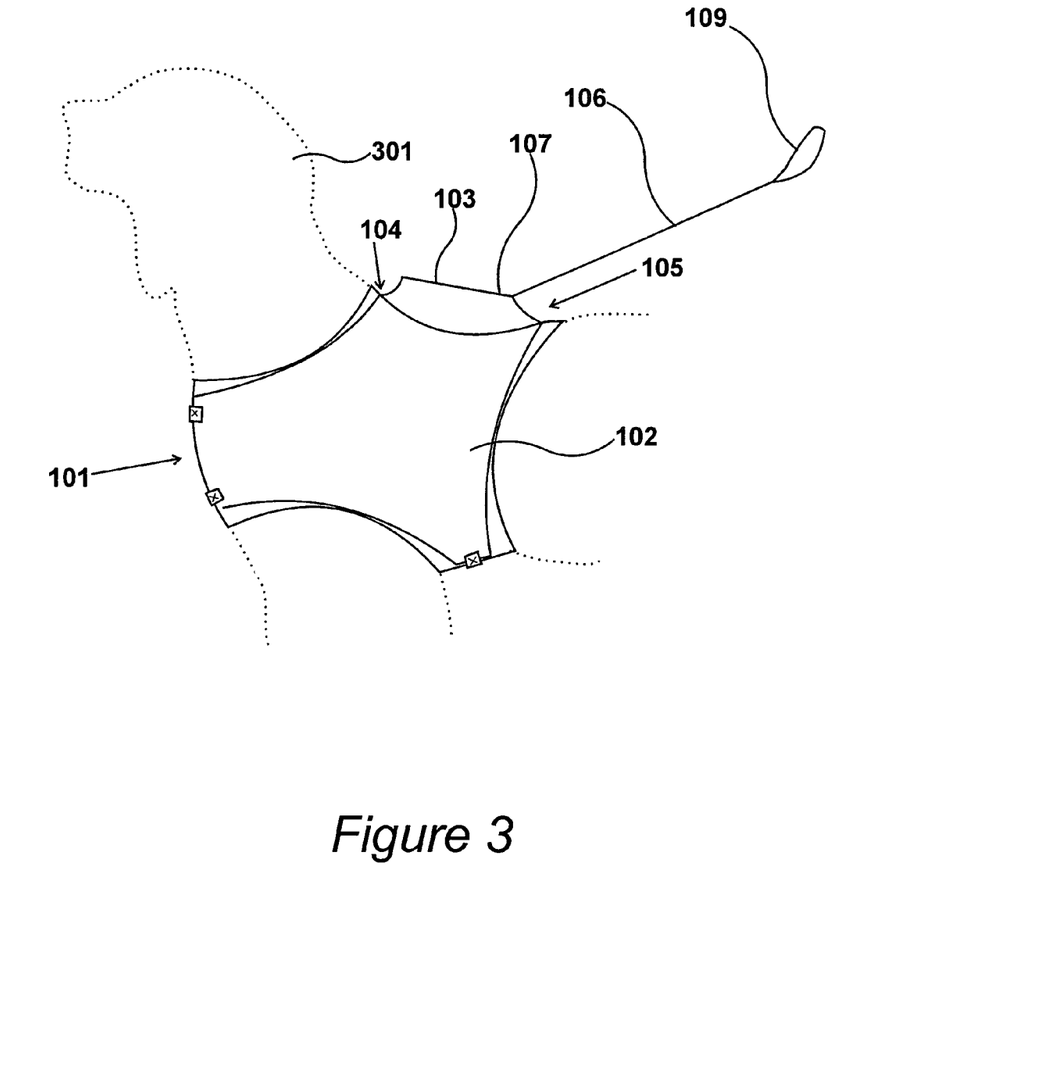
FIG. 3 shows the wander restraint apparatus worn by an animal, in this case a dog.

FIG. 3

Apparatus 101 is shown in FIG. 3 worn by an animal, in this case a dog 301. The apparatus as worn is ready for use by a guardian, for example when walking the dog. It can be seen clearly in FIG. 3 that wearable item 102 has a head end and a rear end. Pocket 103 is oriented such that the first aperture 104 is towards the head end and the second aperture 105 is towards the rear end. It can further be seen that when the wearable item is in use, the pocket 103 is sited substantially centrally between the arm limbs of the body.

In the shown arrangement; the handle 109 may be drawn beyond the rear end of the wearable item. In an embodiment, leash 106 is a retractable leash.

Figure 4:
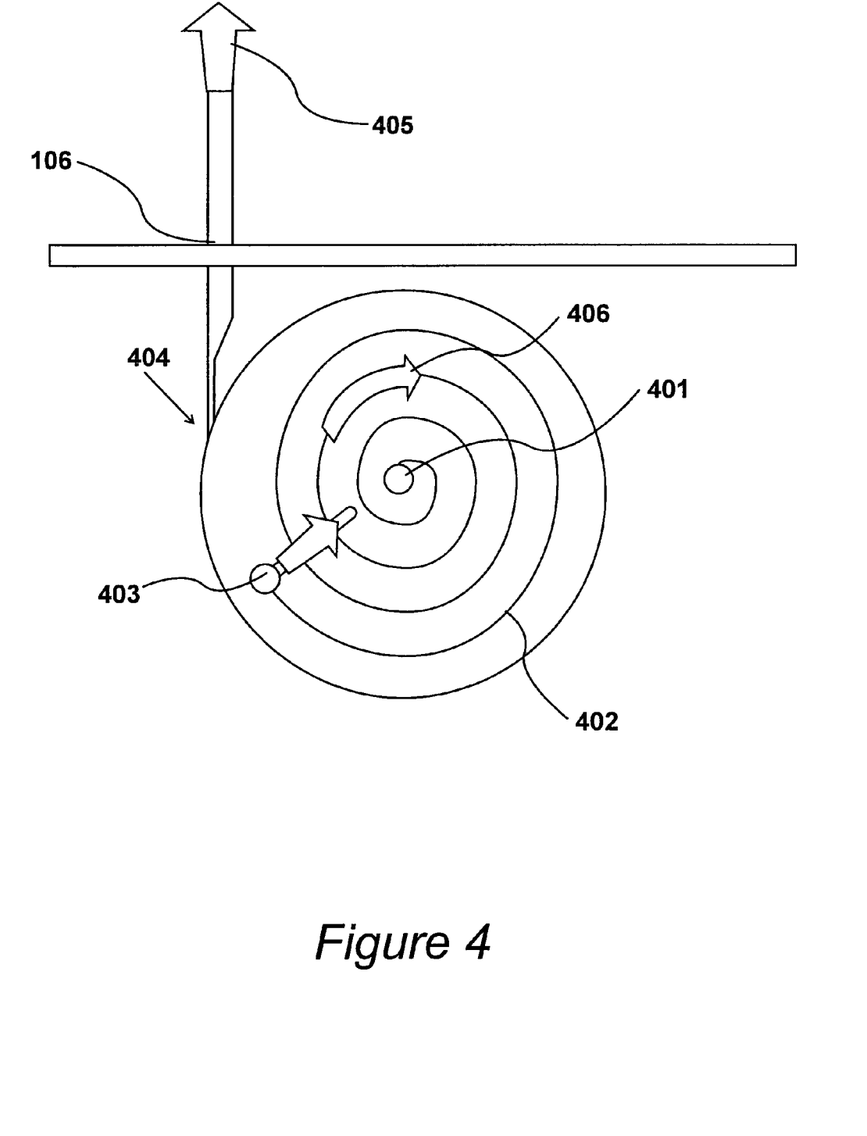
FIG. 4 shows a leash housing comprising a retracting mechanism.

FIG. 4

In an embodiment, housing 107 of leash 106 comprises a retracting mechanism configured to retract the leash into the housing.

FIG. 4 illustrates a type of retracting mechanism that utilises a string biased spool (coil-in-tension) system. As illustrated, the retracting mechanism comprises a substantially central fixed anchor point 401. A first end of a wire cable 402 is connected to the anchor point 401, and the cable is wrapped around the anchor point to form a coil having a free end 403. The second end of leash 106 is connected to the second end 403 of cable 402.

As leash 106 is drawn away from the housing, through the aperture indicated at 404, in the direction of arrow 405, the second end 403 of the coil travels in the direction of arrow 406. This action causes the wire coil remaining within the housing to tighten upon itself.

Figure 5:
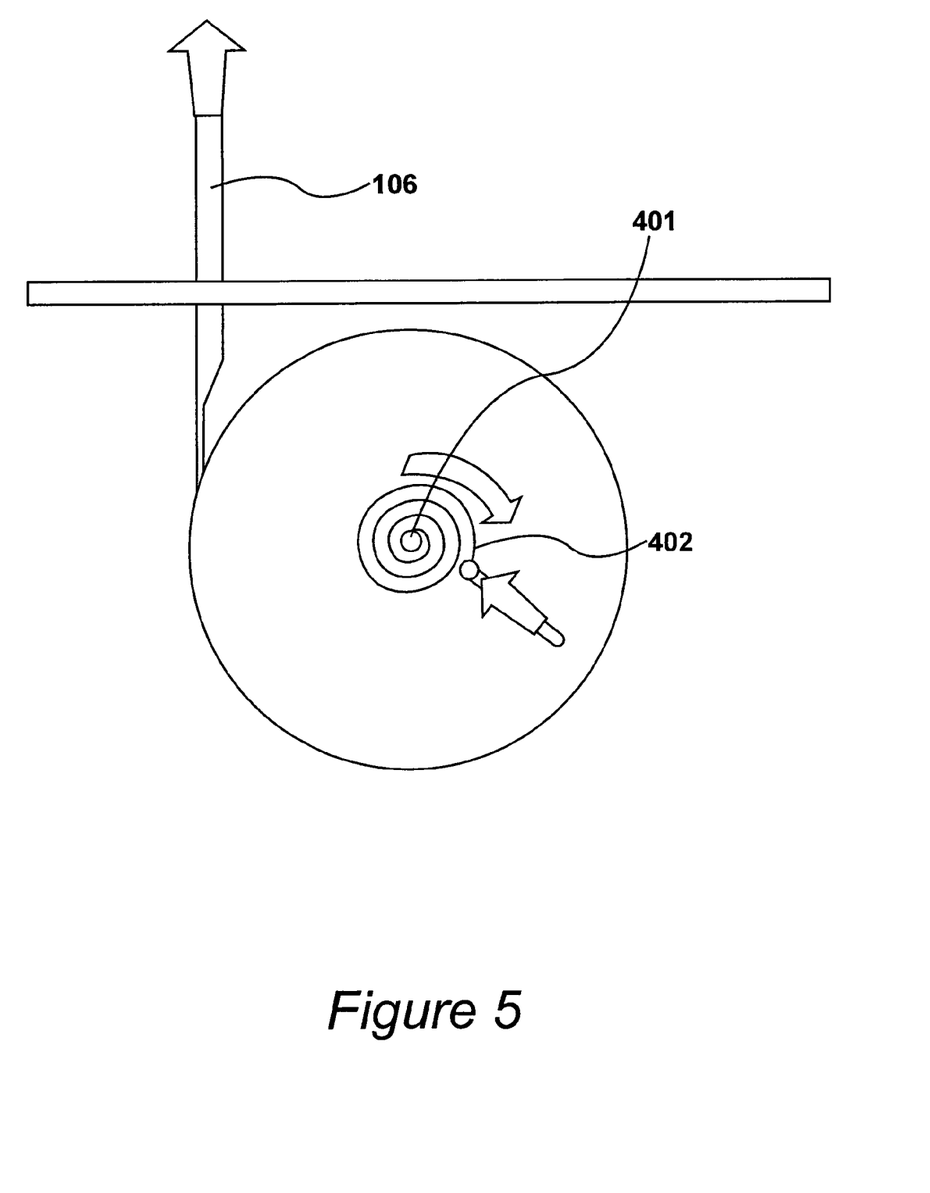
FIG. 5 shows the retracting mechanism following maximum unwinding of the leash.

FIG. 5

FIG. 5 shows the wire coil 402 following maximum unwinding of leash 106. It is to be understood that as the wire coil is tightened by the action of drawing out the leash, that tension is imparted into the coil as it reduces in size and is more tightly wound around the central axis of anchor point 401. The tension in the tightly wound wire coil 402 is such that when the tension in the leash is decreased, the wire coil 402 acts to return to its original shape and, in doing so, to retract the handle end of leash back towards the housing.

Figure 6:
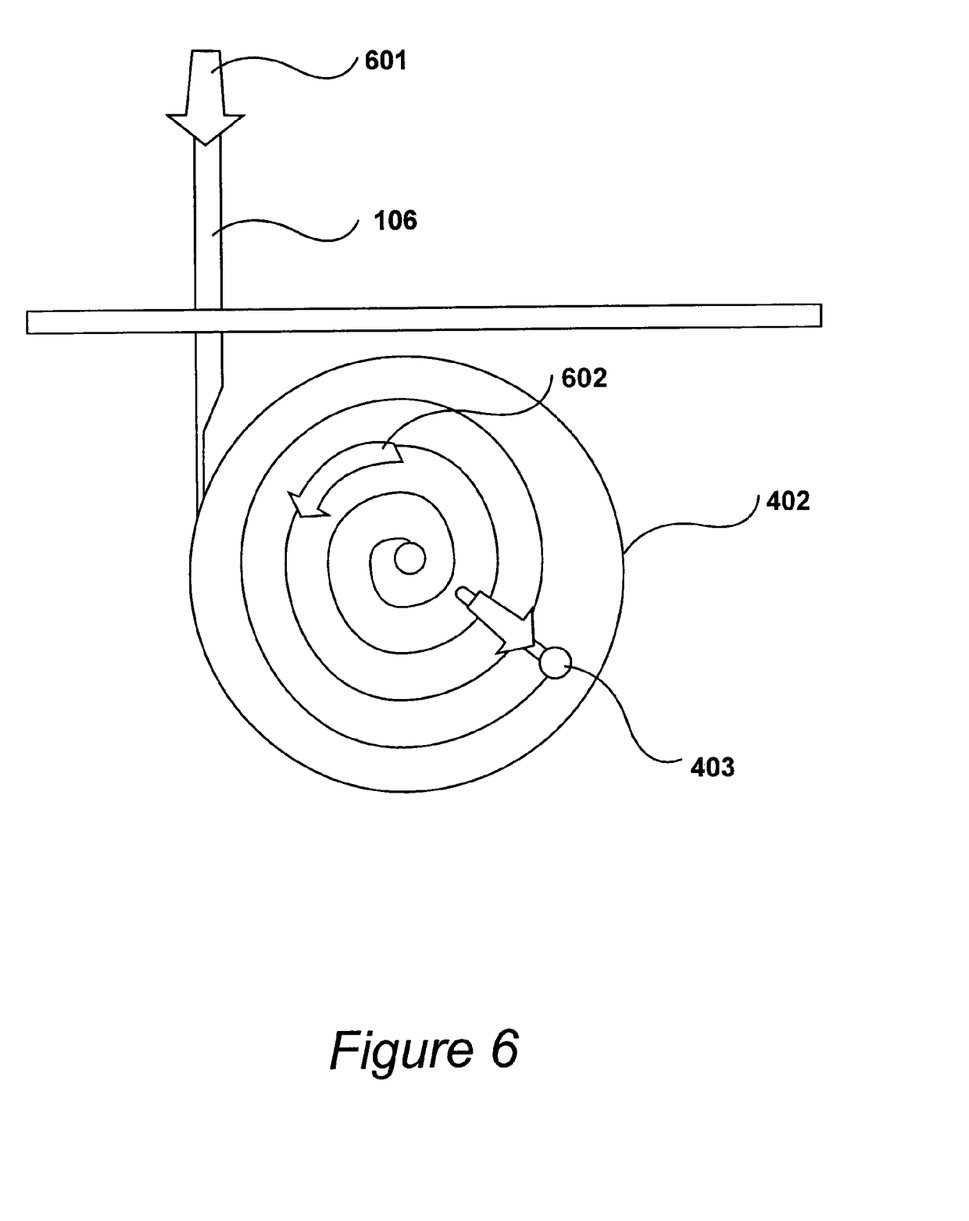
FIG. 6 illustrates the retracting mechanism when the end of the leash and the housing are brought closer together.

FIG. 6

In FIG. 6, arrow 601 illustrates the end of the leash 106 and the housing being brought closer together. In response, the second end 403 of coil 402 moves in the direction of arrow 602, which is the opposite direction to arrow 406 of FIG. 4.

Thus, the retracting mechanism of FIGS. 4 to 6 is biased towards the original shape in which the leash is fully winding in the leash 106.

Figure 7:
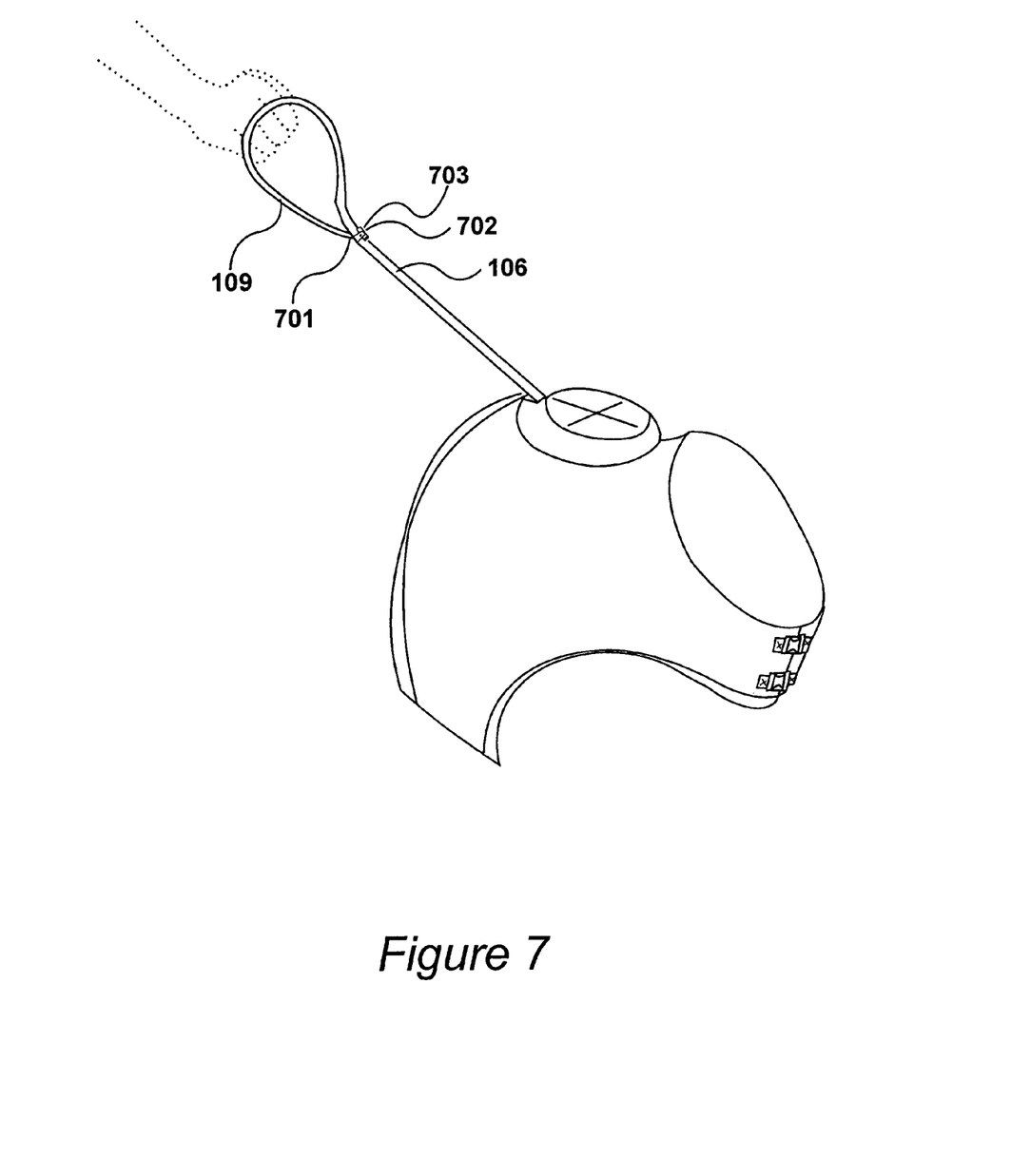
FIG. 7 illustrates how a user is able to grip the handle of the leash in order to prevent the wearer of the wearable item from wandering too far.

FIG. 7

As illustrated in FIG. 7, a user is able to grip handle 109 of leash 106 in order to prevent the wearer of the wearable item from wandering too far. The retractable leash 106 thus enables the wearer of the wearable item to wander to the maximum length of leash 106. However, when the wearer of the wearable item is at a distance away from the handle that is less than the maximum length allowed by the retracting mechanism, the leash will be reeled in as described above such that any slack in the leash is taken by the housing. This is advantageous to reduce tangling of the leash around parts of the body of the harness wearer and to reduce the risk of presenting a trip hazard to others close by.

In an alternative embodiment, the handle 109 of leash 106 is constructed by doubling back end portion 701 of leash 106 and securing it back on itself with fastening mechanism 702. Fastening mechanism 702 is configured to fasten end portion 701 in place on portion 703 of leash 106, thereby creating handle 109.

In this illustrated example, fastening mechanism 702 comprises a revolving pin and eyelet. The revolving pin is positioned at end portion 701 of leash 106 and the eyelet is positioned at portion 703 of leash 106. The pin is configured to be inserted through the eyelet and subsequently revolved through 90 degrees to prevent withdrawal of the pin and to create handle 109.

Figure 8:
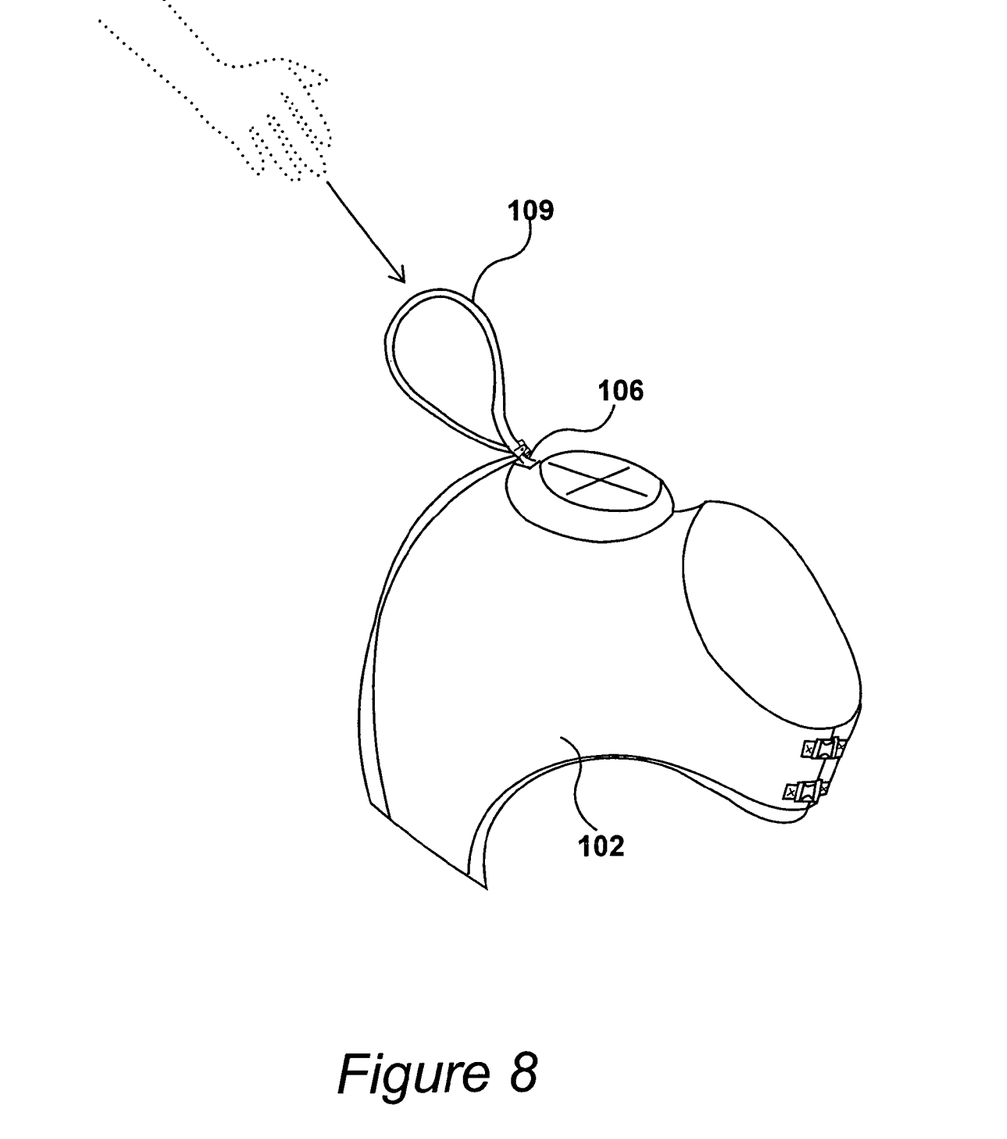
FIG. 8 illustrates the position of the handle of the leash after it has been released by a user.

FIG. 8

As shown in FIG. 8, when the handle 109 of retractable leash 106 is released, the retracting mechanism of the leash, acts to pull the handle in towards the wearable item 102. In this way, the leash is carried by the harness and hence the wearer of the wearable item. When fully retracted, the handle of the leash remains available to be gripped.

The arrangement of the wearable item and leash of the present invention provides several advantages. The location of the leash on the back of the wearable item serves to overcome the awkwardness of the operations of clipping a leash to the wearable item and subsequently unclipping the leash from the wearable item. This is an advantage when the wearer of the wearable item is prone to erratic movement or is otherwise resistant to remaining still whilst the connecting and disconnecting operations are performed. The wearable item also allows the leash to be connected to the wearable item prior to the wearable item being secured around the body of the intended wearer. The leash is then tidily stored by the wearable item so as not to interfere with the process of securing the wearable item for use.

By alleviating any awkward clipping of the leash to the wearable item, the apparatus may be used comfortably by a person whose dexterity is permanently or temporarily impaired.

By arranging for the leash to be carried by the harness, the guardian is relieved of having to find somewhere to carry the leash about their personage. The risk of loss of an unclipped lead is also reduced since the leash remains secured to the wearer of the harness at all times.

In some public environments, there is an expectation that a responsible owner of a dog for example will ensure that a leash is attached to the dog at all times to allow control of the dog to be maintained or regained at any moment. Control may be desired for the protection of the wearer of the wearable item or for the protection of others in the immediate environment. The arrangement of the disclosed apparatus presents a handle for a person to catch hold of and hence restrict the freedom of movement of the wearable item wearer. Use of a retractable mechanism for the leash, or use of a relatively short leash, serves to prevent the leash from trailing in a manner that would present a tangle or trip hazard.

Figure 9:
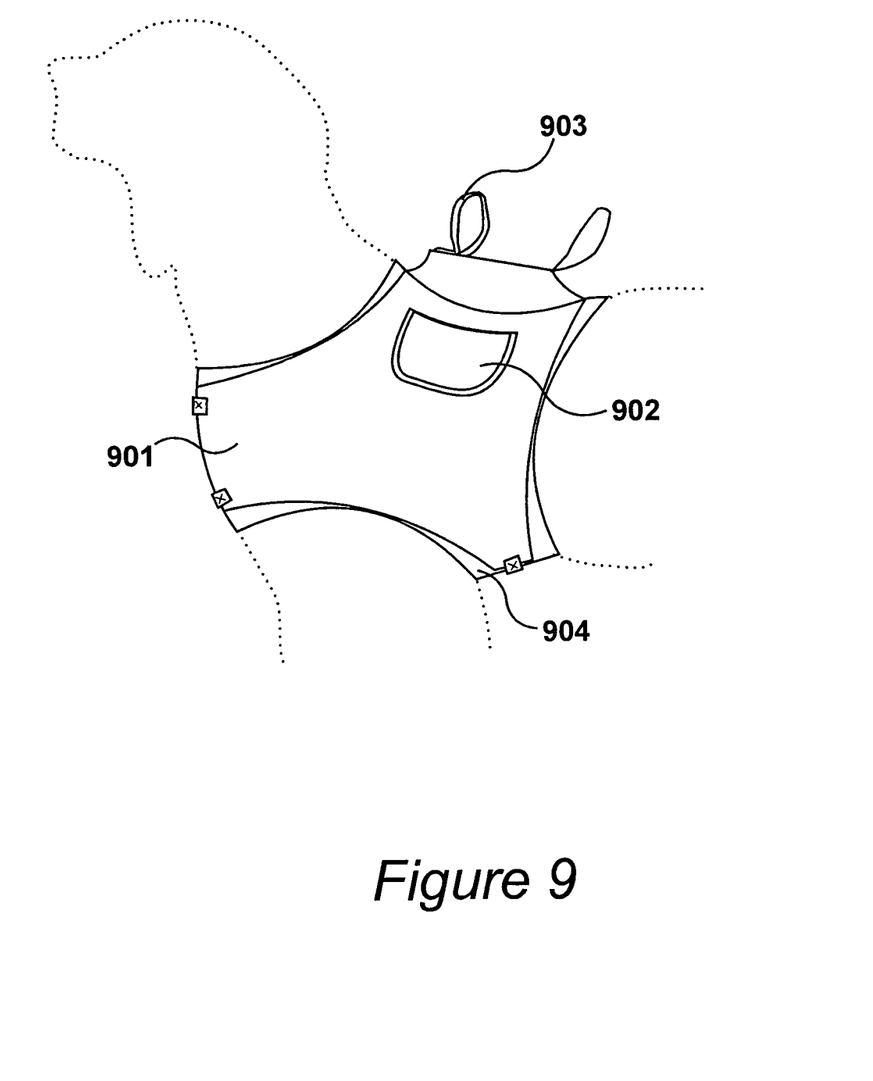
FIG. 9 shows further details of an embodiment of the invention.

FIG. 9

Further details of an embodiment are described with reference to FIG. 9. Harness 901 includes the features of wearable item 102 along with some additional features. Harness 901 comprises at least one further pocket, such as pocket 902. This pocket may be used to conveniently carry other items that may be associated with a wearer of the harness, for example a toy for an animal or child. In this embodiment, which is configured particularly for a dog, harness 901 includes a loop 903 for location around a car seat belt, to allow the animal to be secured within a car for safe travel.

In an embodiment, the fabrication of the harness includes a breathable fabric. The fabrication of the harness may also include a spacer fabric. Further the harness may comprise an inner comfort lining 904. These features of the harness fabrication function to maintain the comfort of the wearer by reducing the occurrence of irritation such as may result from sweating or chaffing.

In a preferred embodiment, the harness comprises manually adjustable straps to allow more fine adjustment of the harness to fit the body of the wearer. Through the use of lightweight and soft materials, comfort for the wearer of the harness can be improved.

In an embodiment, the housing of the leash is fabricated from plastic. In an embodiment, the fabrication of the harness is washable, preferably machine-washable. In a harness intended for use with a dog, a pocket may be provided in which plastic bags to receive dog excrement may be conveniently carried by the dog. Hence, a person walking the dog can avert a degree of unpleasantness associated with transporting dog waste themselves. In an embodiment, the leash is fabricated from a ribbon or a tape or any other suitable material, and preferably has a thickness or diameter of at least 1 cm. In an embodiment, the harness has fabric piping around the edges, again for the purposes of ensuring comfort.

Figure 10:
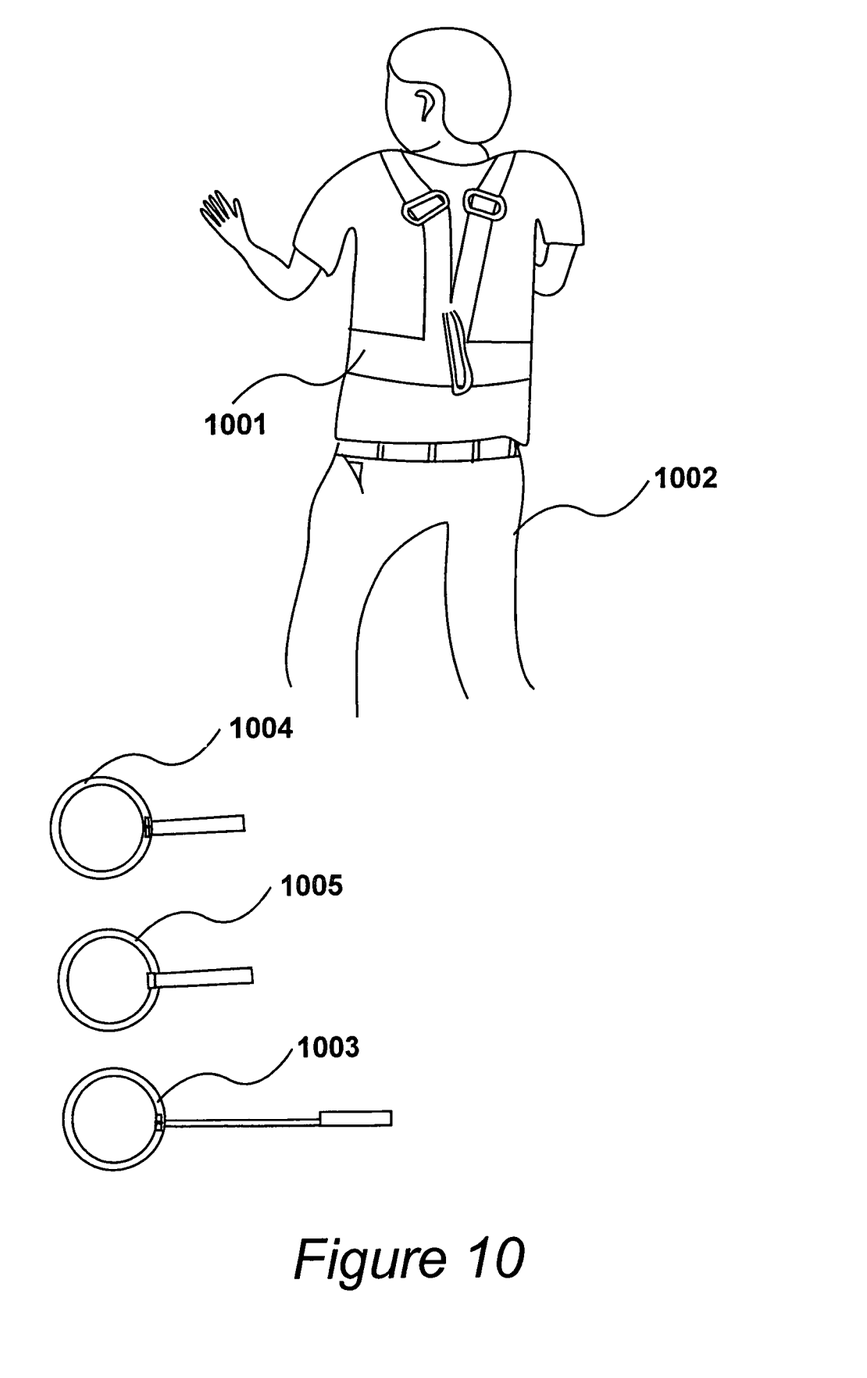
FIG. 10 shows an alternative embodiment of apparatus.

FIG. 10

FIG. 10 shows an alternative embodiment of apparatus. Harness 1001 is configured to be worn by a child, such as toddler 1002. It is to be appreciated that the housing of the leash is removable from the harness. Consequently a variety of different compatible leashes, such as leashes 1003, 1004 and 1005, may be made available for selective use with a harness or other form of wearable item. For example, leash 1003 is a relatively short non-retractable type, leash 1004 is a retractable type having a first maximum length and leash 1005 is a retractable type having a second different maximum length. In an example, the leash has a maximum length of approximately 120 cm. Leashes may also vary in style, colour and pattern, thus allowing a user to change a leash according to fashion, for example, The arrangement of a leash that is separable from the wearable item of the wander restraint apparatus also enables convenient replacement of a damaged leash.

The invention claimed is:

1. Wearable wander restraint apparatus for a child or an animal, comprising:
   a wearable item configured to be secured around body and arm limbs of the child or the animal,
   said wearable item comprising a pocket presenting a first aperture and a second aperture, and
   a leash having a first end secured within a housing and a second end secured to a handle; wherein
   said handle is configured to extend through and be passed from within said pocket through said second aperture;
   said housing is configured to be removably received within said pocket through said first aperture such that said leash is separable from said wearable item when said housing is removed from said pocket, wherein said leash that extends through said second aperture is removable through said second aperture when said housing is removed from said pocket;
   said leash is located on a back of said wearable item when received in said pocket; and
   wherein said housing comprises a retracting mechanism configured to retract said leash into said housing.

2. Apparatus according to claim 1, wherein said leash comprises an end portion extending from said second end of said leash and a fastening mechanism configured to releasably fasten said end portion to said leash to form said handle.

3. Apparatus according to claim 1, wherein said wearable item has a head end and a rear end, and said pocket is oriented such that said first aperture is towards said head end and said second aperture is towards said rear end.

4. Apparatus according to claim 1, wherein said pocket is located such that when the wearable item is in use, the pocket is sited substantially centrally between the arm limbs.

5. Apparatus according to claim 1, wherein said wearable item is configured to be secured around the body and arm limbs using releasable push clips.

6. Apparatus according to claim 1, wherein said wearable item comprises at least one further pocket.

7. Apparatus according to claim 1, wherein said wearable item is configured to be used with a dog and comprises a loop for a car seat belt to be threaded through to allow the dog to be secured in a car for safe travel.

8. Apparatus according to claim 1, wherein the fabrication of said wearable item includes a breathable fabric.

9. Apparatus according to claim 1, wherein said wearable item further comprises a lining to facilitate comfortable wearing.

10. Apparatus according to claim 1, wherein said wearable item further comprises manually adjustable straps to allow the wearable item to be fitted more closely to the body.

11. Apparatus according to claim 1, wherein said housing is fabricated from a plastics material.

12. Apparatus according to claim 1, wherein said leash has a maximum length of approximately 120 cm.

13. Apparatus according to claim 1, wherein said retracting mechanism utilises a spring-biased spool system.

14. A method of providing wearable wander restraint apparatus for a child or an animal, comprising the steps of:
   providing a wearable item having a pocket presenting a first aperture and a second aperture, said wearable item configured to be secured around the body and arm limbs of a child or an animal;
   providing a leash having a first end secured within a housing and a second end secured to a handle, said housing configured to be removably inserted through said first aperture into said pocket such that said leash is separable from said wearable item when said housing is removed from said pocket, and said leash configured to extend from located housing through said second aperture such that said handle is external of said pocket, said leash being located on a back of said wearable item when received in said pocket, wherein said leash that extends through said second aperture is removable through said second aperture when said housing is removed from said pocket; and
   wherein said housing comprises a retracting mechanism configured to retract said leash into said housing.

15. The method according to claim 14, further comprising providing an end portion and a fastening mechanism attached to said leash, said fastening mechanism configured to releasably fasten said end portion to said leash to form the handle.

* * * * *